United States Patent
Wyers

(10) Patent No.: US 7,994,224 B2
(45) Date of Patent: Aug. 9, 2011

(54) SPRAYABLE AEROSOL PAINT COMPOSITION WITH 3-IODO-2-PROPYNYL BUTYL CARBAMATE FUNGICIDE AND A VINYL TOLUENE ALKYD RESIN

(75) Inventor: John D. Wyers, Gurnee, IL (US)

(73) Assignee: Chase Products Co., Broadview, IL (US)

(*) Notice: Subject to any disclaimer, the term of this patent is extended or adjusted under 35 U.S.C. 154(b) by 1170 days.

(21) Appl. No.: 11/481,296

(22) Filed: Jul. 5, 2006

(65) Prior Publication Data

US 2008/0008678 A1    Jan. 10, 2008

(51) Int. Cl.
*A01N 25/00* (2006.01)
*A01N 25/02* (2006.01)
*A01N 37/18* (2006.01)
*A61K 9/00* (2006.01)
*A61K 9/12* (2006.01)
*A61K 47/32* (2006.01)

(52) U.S. Cl. ............ 514/628; 514/613; 514/772.4; 424/45; 424/405

(58) Field of Classification Search .......... 514/613, 514/628, 772.4; 424/45, 405
See application file for complete search history.

(56) References Cited

U.S. PATENT DOCUMENTS

| | | | |
|---|---|---|---|
| 4,421,766 A * | 12/1983 | Morisawa et al. | 514/549 |
| 5,078,792 A | 1/1992 | Hinkle et al. | |
| 5,348,992 A | 9/1994 | Pearson et al. | |
| 6,160,034 A | 12/2000 | Allison et al. | |
| 6,838,492 B2 | 1/2005 | Maleeny et al. | |
| 6,992,208 B2 * | 1/2006 | Schneider et al. | 560/167 |
| 7,018,557 B2 | 3/2006 | Redding | |
| 2004/0127605 A1 | 7/2004 | Redding | |
| 2005/0030360 A1 | 2/2005 | Bauer et al. | |
| 2005/0147579 A1 | 7/2005 | Schneider et al. | |

OTHER PUBLICATIONS

Total Petrochemicals' MSDS for "150 solvent"—accessed Mar. 27, 2010 at www/alchemchemical.com/product-details/items/25.html.*

* cited by examiner

*Primary Examiner* — James H Alstrum Acevedo
(74) *Attorney, Agent, or Firm* — Greenblum & Bernstein, P.L.C.

(57) ABSTRACT

An aerosol paint composition includes an alkyd resin; one or more solvents; an organoclay; an anti-settling wax; a dispersing agent; one or more pigments; a drying agent; an anti-skinning agent; a fragrance; and a fungicide.

16 Claims, No Drawings

SPRAYABLE AEROSOL PAINT COMPOSITION WITH 3-IODO-2-PROPYNYL BUTYL CARBAMATE FUNGICIDE AND A VINYL TOLUENE ALKYD RESIN

BACKGROUND OF THE INVENTION

The present invention is directed to an aerosol paint composition comprising a fungicide and to a sprayable aerosol composition comprising the aerosol paint composition.

Although paints having mildew preventing agents are known, it is difficult to formulate a sprayable aerosol composition having a fungicide. In particular, it is difficult to incorporate a fungicide into a solvent-based aerosol composition without the fungicide becoming inactive. In addition, it is difficult to incorporate a resin into a sprayable aerosol composition that adheres to a wide variety of surfaces, especially to surfaces that have been poorly cleaned.

It is an object of the present invention to develop a sprayable aerosol composition containing a fungicide that can be atomized properly in a continuous spray system, yet is thick enough to cover a substrate completely in one coat, without sagging, running, or dripping.

SUMMARY OF THE INVENTION

The aerosol paint composition according to the present invention includes a resin; one or more solvents; a rheology agent; an anti-settling agent; a dispersing agent; a pigment; a drying agent; an anti-skinning agent; a fragrance; and a fungicide. According to the present invention, the fungicide remains active in a sprayable aerosol composition, and the composition adheres well to poorly-cleaned surfaces. The sprayable aerosol composition may be used to provide both interior coatings and exterior coatings.

DETAILED DESCRIPTION OF THE INVENTION

According to the present invention, an aerosol paint composition comprises a resin; one or more solvents; a rheology agent; an anti-settling agent; a dispersing agent; a pigment; a drying agent; an anti-skinning agent; a fragrance; and a fungicide. The aerosol paint composition may also contain a filler or extender. The aerosol paint composition may also contain an anti-flocculation agent.

The resin in the aerosol paint composition of the present invention acts as a binder which holds the various ingredients together in a homogeneous mix and adheres to the substrate to be coated or painted. In embodiments, the resin may be one or more of an aromatic resin, alkyd resin, acrylic resin, polyester resin, polyurethane resin, or epoxy resin. In preferred embodiments, the resin may be an alkyd resin, including modified alkyds such as vinyl toluene modified alkyd resins, acrylic modified alkyd resins, styrene modified alkyd resins, acrylic/vinyl toluene modified alkyd resins, and styrene/vinyl toluene modified alkyd resins. The resin may be present in the aerosol paint composition in an amount of about 10-70% by weight, preferably about 15-60% by weight, based upon the total weight of the aerosol paint composition.

The aerosol paint composition may contain one or more solvents. In embodiments, the one or more solvents include, but are not limited to, an aromatic solvent, oxygenated solvent, aliphatic solvent, or mixtures thereof. In preferred embodiments, the solvent may be toluene, 150 Solvent, acetone, or mixtures thereof. 150 Solvent is a mixture of petroleum-based solvents generally comprising aromatic petroleum distillates (96+%) and having a flash point of about 150° F. 150 Solvent is commercially available as Hi Sol 15 or Aromatic 150. The one or more solvents may be present in the aerosol paint composition in an amount of about 10-50% by weight, preferably about 15-40% by weight, based upon the total weight of the aerosol paint composition.

The aerosol paint composition also comprises a rheology agent. Suitable rheology agents may comprise organoclays, fumed silica, dehydrated castor oil organic derivatives, English China Clay; polyamides, polyamide modified alkyds, alkylbenzene sulphonate derivatives, calcium and zinc stearates, calcium soyate, and the like. In embodiments, the organoclay may be a clay such as bentonite, smectite, kaolin, or montmorillonite to which organic structures have been chemically bonded. Examples include, but are not limited to, CLAYTONE® and TIXOGEL® organoclay additives available from Southern Clay Products. The rheology agent allows the paint to form a film without sagging or dripping. The rheology agent may be present in the aerosol paint composition in an amount of about 0.1-5% by weight, preferably about 0.1-3% by weight, based upon the total weight of the aerosol paint composition.

The aerosol paint composition also comprises a dispersing agent to aid in the uniform dispersing of various pigments and/or powders into uniform particle size. The dispersing agent reduces the time required to grind pigments and/or powders. The dispersing agent also aids in maintaining a homogenous mix over time. The dispersing agent is preferably polymeric and may include, but is not limited to, dispersants sold under the trade names Disperbyk® (an alkylammonium salt of a polyfunctional polymer available from BYK-Chemie, USA), Anti-Terra-U (a solution of unsaturated polyamine amides and acid polymers available from BYK-Chemie, USA), Soisperse® (Avecia) and EFKA (EFKA Chemicals). The dispersing agent may be present in the aerosol paint composition in an amount of about 0.2-2% by weight, preferably about 0.2-1% by weight, based upon the total weight of the aerosol paint composition.

The aerosol composition may comprise one or more anti-flocculation agents which work in conjunction with the dispersing agent to enhance its effect. The anti-flocculation agent also reduces the chance that different colored pigments will separate from other and group together to form streaks or patches. In embodiments, such flocculation agents include, but are not limited to, Imperial Antifloat Compound (IAF) Compound X-2280 (barium sulfate). The anti-flocculation agent may be present in the composition in an amount of about 0.1-2% by weight, preferably about 0.2-1% by weight, based upon the total weight of the aerosol paint composition.

The aerosol composition comprises one or more pigments to impart various colors and shades. Suitable pigments are well known in the art and are typical organic pigments, inorganic pigments, or mixtures thereof. Example of such pigments include, but are not limited to, titanium dioxide, carbon black, graphite, ceramic black, antimony sulfide, black iron oxide, aluminum pastes, yellow iron oxide, red iron oxide, iron blue, phthalo blue and green, nickel titanate, dianisidine orange, dinitroaniline orange, imidazole orange, quinacridone red, violet and magenta, toluidine red, molybdate orange, and the like. The pigment may be present in the aerosol composition in an amount of about 5-50% by weight, preferably about 10-40% by weight, based upon the total weight of the aerosol composition.

The aerosol composition may comprise one or more extenders or fillers to reduce the cost and increase the opacity of the paint film. Suitable fillers may include, but are not limited to, amorphous, diatomaceous, fumed, quartz and crystalline silica, clays, aluminum silicates, magnesium aluminum silicates, talc, mica, delaminated clays, calcium carbonates and silicates, gypsum, barium sulfate, zinc, calcium zinc molybdates, zinc oxide, phosphosilicates and borosilicates of calcium, barium and strontium, barium metaborate monohydrate, and the like. In embodiments, the filler may be calcium carbonate such as VICRON® 15-15. The filler may be present in the aerosol composition in an amount of about 0-50% by weight, preferably about 5-40% by weight, based upon the total weight of the aerosol composition.

The aerosol paint composition comprises one or more drying agents to increase the speed with which the resin forms a hard film (i.e., cures). Drying agents include, but are not limited to, metallic and rare earth driers such as cobalt, calcium, potassium, barium, zinc, manganese, tin, aluminum, zirconium and vanadium napthenates, octoates, hexanates, and isodecanoates. In embodiments, the drying agent may comprise a cobalt drier. Cobalt driers include, but are not limited to, an organic cobalt salt such as cobalt naphthenate or cobalt octoacte. The drying agent may be present in the aerosol paint composition in an amount of about 0.05-0.5% by weight, preferably about 0.05-0.4% by weight, based upon the total weight of the aerosol paint composition.

The aerosol paint composition may comprise one or more anti-skinning agents to inhibit the skinning or formation of a solid film at the surface of the liquid paint while it is kept in storage (e.g., in drums or cans). In embodiments, the anti-skinning agent may include, but is not limited to, methyl ethyl ketoxime, o-cresol, or hydroquinone. An example of a commercially available anti-skinning agent is Exkin or Trokyd AntiSkin. The anti-skinning agent may be present in the aerosol paint composition in an amount of about 0.1-0.5% by weight, preferably about 0.2-0.4% by weight, based upon the total weight of the aerosol paint composition.

The aerosol paint composition may comprise one or more fragrances. The fragrance may be used to reduce the offensive smell often associated with spray paint. Any desirable known scenting or fragrance types may be employed provided that the fragrance is compatible with the other ingredients in the mixtures. Examples of scents or fragrances for use in the present invention include, but are not limited to, citrus fragrances such as commercially available Citrus Fragrance Z-125-04; floral fragrances; fruit fragrances; spice fragrances; and vanilla fragrances. The fragrance may be present in the aerosol paint composition in an amount of about 0.1-3% by weight, preferably about 0.1-2% by weight, based upon the total weight of the aerosol paint composition.

The aerosol paint composition comprises one or more fungicides to inhibit the growth of mold or mildew on the surface of the paint. In embodiments, the fungicide may comprise 3-Iodo-2-propynl butyl carbamate. The fungicide may be FUNGITROL®, commercially available from Degussa Corporation or International Specialty Products. However, thiabendazole and diiodomethyl p-tolyl sulfone will not work in the aerosol paint composition or sprayable aerosol formulation of the present invention. Thus, AMICAL 48, commercially available from Dow Chemical Co.; THLABENDAZOLE DISPERSION W, commercially available from Lanxess Corporation; or FUNGITEX TBZ, commercially available from CIBA Specialty Chemicals are incompatible with the aerosol composition. The fungicide may be present in the aerosol paint composition in an amount of about 0.1-3% by weight, preferably about 0.1-1% by weight, based upon the total weight of the aerosol paint composition.

The aerosol paint composition also comprises one or more anti-settling waxes to prevent hard settling of the paint while it is not in use. The pigments that are used to give color to the paint are fairly heavy and tend to settle to the bottom of any liquid medium when they are stored for extended periods. The anti-settling wax prevents these pigments from forming a hard, compacted, solid mass. This allows the aerosol can to be shaken and for the homogenous state of the paint mixture to be restored. In embodiments, the wax may be SUSPENO®, commercially available from Poly-Resyn, Inc. The anti-settling wax may be present in the aerosol paint composition in an amount of about 0.5-5% by weight, preferably about 1-3% by weight, based upon the total weight of the aerosol paint composition.

The aerosol paint composition of the present invention is a concentrate and may be combined with additional thinning solvents and propellants to obtain a sprayable aerosol formulation. In embodiments, the propellant may comprise propane, butane, or combinations thereof. An example of the thinning solvent includes acetone and an example of the propellant includes A-80 having a pressure of about 80 psi.

According to the present invention, different methods may be used in the manufacture of the aerosol paint composition. In embodiments, a first method involves grinding the one or more pigments into the resin with a high-speed dispersion mixer (such as a cowles). Shading pastes may be subsequently added for color correction. A second method involves grinding both white and colored pigments using a high-speed mill, for example, a sandmill. Shading pastes may be subsequently added for color correction. The mixing speeds and temperatures may vary with the aerosol paint composition and the equipment used. In embodiments, temperature of about 100° F. or higher may be reached due to milling and grinding. In embodiments, mixing speeds may be up to about 10,000 rpm.

The sprayable aerosol formulation may be used with any appropriate valve and actuator. In embodiments, the valve may be model SV-77/IU13 (Dip tube, AD Plain; Mount cup, EPT/LAMB con; Gasket, 0.050 Butyl SV-77/92; Spring, 0.023; Body, BV assy 1×0.045 RE ⅛ inch SS Ball; Stem, 2×0.020 0.349 Nat). The actuator may be a 35 mm actuator and overcap assembly (0.020×0.030).

The following examples are intended for illustration purposes only, and should not be deemed to limit the scope of the invention as defined in the appended claims. All parts, percentages, proportions, and ratios are by weight, and all temperatures are in ° F. unless otherwise indicated:

EXAMPLES

The amounts are percentages by weight, based upon the weight of the total aerosol paint composition.

Example 1

A alkyd resin and 150 Solvent were put into a mixing tank having a Cowles Blade:

| 12.88 | VT Alkyd Copolymer Resin |
| 1.18 | 150 Solvent |

The mixer was started and the following ingredients were added individually:

| 1.59 | SUSPENO 201X |
| 0.16 | CLAYTONE HY |
| 0.48 | DISPERBYK-181 |

-continued

| | |
|---|---|
| 23.89 | TiO2 |
| 23.89 | VICRON 15—15 |
| 3.12 | Toluene |

The ingredients were mixed at high speed of about 9,000 RPM for about 20 minutes to a 7+ grind as measured using a Hegman grind gauge. Next, the following ingredients were added individually:

| | |
|---|---|
| 13.93 | VT Alkyd Copolymer Resin |
| 0.09 | 6% Cobalt |
| 0.26 | EXKIN |
| 0.34 | FUNGITROL 820 |
| 0.90 | Citrus Fragrance Z-125-04 |
| 4.26 | Acetone |
| 13.03 | Toluene |

The mixture was mixed for an additional 10 minutes to form an aerosol paint composition.

Example 2

An alkyd resin and 150 Solvent were put into a mixing tank having a Cowles Blade:

| | |
|---|---|
| 2.93 | VT Alkyd Copolymer Resin |
| 0.10 | 150 Solvent |

The mixer was started and the following ingredients were added individually:

| | |
|---|---|
| 0.49 | BYK-181 |
| 0.49 | X-2280 |
| 2.45 | Yellow Iron Oxide |

The ingredients were mixed at high speed of about 9,000 RPM for about 20 minutes. Then, the mixture was sandmilled to a 7+ grind, and rinse milled with the following ingredients:

| | |
|---|---|
| 0.78 | VT Alkyd Copolymer Resin |
| 0.38 | Toluene |

While the first tank was mixing, the following ingredients were added into a second mixing tank with a Cowles Blade:

| | |
|---|---|
| 11.71 | VT Alkyd Copolymer Resin |
| 1.35 | 150 Solvent |

The mixer was started, and the following items were added individually:

| | |
|---|---|
| 0.2 | TIXOGEL TE |
| 0.10 | ANTI-TERRA-U |
| 1.96 | SUSPENO 201X |
| 13.70 | TiO2 |
| 19.57 | VICRON 15—15 |

The ingredients were mixed at high speed of about 9,000 RPM for about 20 minutes to a 7+ grind. When this was done for the second tank, the two tanks were combined and the following items were individually added while mixing:

| | |
|---|---|
| 13.86 | VT Alkyd Copolymer Resin |
| 0.10 | 6% Cobalt |
| 0.29 | EXKIN |
| 0.37 | FUNGITROL 820 |
| 0.88 | Fragrance Z-125-04 |
| 28.31 | Toluene |

The mixture was mixed for an additional 10 minutes to form an aerosol paint composition.

While the present invention has been described in connection with its preferred forms and embodiments with a certain degree of particularity, it is to be understood and it will be apparent to those skilled in the art that the present disclosure has been made by way of example only and that numerous changes and modifications in the details of the products and processes may be made without departing from the true spirit and scope of the invention. Accordingly, it is intended by the appended claims to cover all such changes and modifications as come within the scope of the invention.

What is claimed is:

1. A sprayable aerosol composition comprising an aerosol paint composition and a propellant, wherein said aerosol paint composition comprises:
   about 10-70% by weight of a resin, wherein the resin is a vinyl toluene alkyd resin;
   about 10-50% by weight of one or more solvents wherein the one or more solvents comprise toluene, 150 solvent, acetone, or mixtures thereof;
   about 0.5-5% by weight of an anti-settling wax;
   about 0.2-2% by weight of a dispersing agent;
   about 5-50% by weight of one or more pigments;
   about 0.05-0.5% by weight of a drying agent;
   about 0.1-0.5% by weight of an anti-skinning agent;
   about 0.1-3% by weight of a fragrance; and
   a fungicide,
   wherein the fungicide comprises about 0.1-3% by weight of 3-iodo-2-propynl butyl carbamate.

2. A sprayable aerosol composition according to claim 1, wherein said aerosol paint composition further comprises an anti-flocculation agent.

3. A sprayable aerosol composition according to claim 2, wherein the amount of anti-flocculation agent is about 0.1-2% by weight.

4. A sprayable aerosol composition according to claim 1, wherein the one or more solvents is present in an amount of about 15-40% by weight, based upon the total weight of the aerosol paint composition and comprises toluene.

5. A sprayable aerosol composition according to claim 1, wherein the drying agent comprises an organic cobalt salt.

6. A sprayable aerosol composition according to claim 1, wherein the anti-skinning agent comprises methyl ethyl ketoxime.

7. A sprayable aerosol composition according to claim 1, wherein the fungicide comprises about 0.1-1% by weight of 3-Iodo-2-propynl butyl carbamate.

8. A sprayable aerosol composition of claim 1 wherein said propellant comprises propane, butane, or mixtures thereof.

9. A sprayable aerosol composition according to claim 1, further comprising a thinning solvent.

10. An aerosol spray system comprising an aerosol can which comprises a valve, an actuator, and the sprayable aerosol composition of claim 1.

11. A sprayable aerosol composition comprising an aerosol paint composition and a propellant wherein said aerosol paint composition comprises:
    about 10-70% by weight of a resin, wherein the resin is a vinyl toluene modified alkyd resin;
    about 10-50% by weight of one or more of an aromatic solvent, an aliphatic solvent, an oxygenated solvent, or mixtures thereof;
    about 5-50% by weight of one or more pigments;
    about 0.1-3% by weight of a fragrance; and
    about 0.1-3% by weight of 3-iodo-2-propynl butyl carbamate.

12. A sprayable aerosol composition according to claim 11, wherein the amount of the vinyl toluene modified alkyd resin is about 15% by weight to 60% by weight, and the amount of solvent is about 15% to 40% by weight, based upon the total weight of the aerosol paint composition.

13. A sprayable aerosol composition according to claim 12, wherein said aerosol paint composition comprises
    about 0.1-5% by weight of an organoclay;
    about 0.5-5% by weight of an anti-settling wax;
    about 0.2-2% by weight of a dispersing agent;
    about 0.05-0.5% by weight of a drying agent; and
    about 0.1-0.5% by weight of an anti-skinning agent.

14. A sprayable aerosol composition according to claim 12, wherein said propellant comprises propane, butane, or mixtures thereof.

15. A sprayable aerosol composition according to claim 14, further comprising a thinning solvent comprising acetone.

16. An aerosol spray system comprising an aerosol can which comprises a valve, an actuator, and the sprayable aerosol composition of claim 11.

* * * * *